US009461959B2

(12) United States Patent
Chen et al.

(10) Patent No.: US 9,461,959 B2
(45) Date of Patent: Oct. 4, 2016

(54) TECHNIQUES FOR AUTO ASSIGNING IP TELEPHONE EXTENSION NUMBERS BASED ON A PORT

(75) Inventors: Geng Chen, San Jose, CA (US); Gary Dennis Vogel, Jr., Sunnyvale, CA (US); Ron Lewis, Hayward, CA (US)

(73) Assignee: Cisco Technology, Inc., San Jose, CA (US)

( * ) Notice: Subject to any disclaimer, the term of this patent is extended or adjusted under 35 U.S.C. 154(b) by 2156 days.

(21) Appl. No.: 11/443,899

(22) Filed: May 30, 2006

(65) Prior Publication Data

US 2007/0280212 A1 Dec. 6, 2007

(51) Int. Cl.
*H04L 29/06* (2006.01)
*G06F 13/00* (2006.01)
*H04Q 3/72* (2006.01)
*H04L 29/12* (2006.01)

(52) U.S. Cl.
CPC ....... *H04L 61/103* (2013.01); *H04L 29/12028* (2013.01); *H04L 29/12896* (2013.01); *H04L 61/2015* (2013.01); *H04L 61/605* (2013.01); *H04L 65/1073* (2013.01); *H04L 65/1036* (2013.01)

(58) Field of Classification Search
CPC ........... H04M 15/56; H04L 29/12896; H04L 61/2007; H04L 61/2076
USPC .......................................................... 370/356
See application file for complete search history.

(56) References Cited

U.S. PATENT DOCUMENTS 5,457,693 A * 10/1995 Sasaki ........................... 370/521
6,359,892 B1 * 3/2002 Szlam ............... H04M 3/42229 370/401
6,970,823 B1 * 11/2005 Yago et al. ................... 704/270
7,127,044 B1 * 10/2006 Becker .................... H04M 3/42 379/45
2001/0005366 A1 * 6/2001 Kobayashi .................... 370/352
2002/0124100 A1 * 9/2002 Adams .......................... 709/232
2002/0141352 A1 * 10/2002 Fangman et al. ............. 370/254
2002/0178267 A1 * 11/2002 Ooki ....................... H04L 29/06 709/227
2004/0202153 A1 * 10/2004 Koyama ...................... 370/352
2005/0163118 A1 * 7/2005 Steindl .......................... 370/389
2005/0252957 A1 11/2005 Howarth et al.
2006/0248229 A1 * 11/2006 Saunderson et al. ......... 709/245
2007/0177577 A1 * 8/2007 Kolor et al. .................. 370/352

OTHER PUBLICATIONS

M. Patrick, "DHCP Relay Agent Information Option" Network Working Group, Category: Standards Track, 14 pages, Jan. 2001.
R. Droms, "Dynamic Host Confirmation Protocol", Network Working Group, Category: Standards Track, 43 pages, Mar. 1997.

* cited by examiner

*Primary Examiner* — Asad Nawaz
*Assistant Examiner* — Jason Harley
(74) *Attorney, Agent, or Firm* — Parker Ibrahim & Berg LLC; James M. Behmke; Stephen D. LeBarron

(57) ABSTRACT

Techniques are provided for assigning extension numbers to Internet Protocol (IP) telephony devices. The techniques include receiving a message from the IP telephony device requesting that an extension be assigned. A port identifier of a port in which the IP telephony device is coupled is determined. Extension numbers are fixed for specific ports. Thus, an extension number for the port identifier of the port is determined. The extension number is then assigned to the IP telephony device. For example, a MAC address for the IP phone is assigned to the extension number.

17 Claims, 6 Drawing Sheets

102

202 Extension Assigner

204

| Port | Ext |
|---|---|
| 108-1 | 101 |
| 108-2 | 102 |
| 108-3 | 103 |
| 108-4 | 104 |

| MAC | Ext |
|---|---|
| 108-1 | 101 |

206

TECHNIQUES FOR AUTO ASSIGNING IP TELEPHONE EXTENSION NUMBERS BASED ON A PORT

BACKGROUND OF THE INVENTION

Embodiments of the present invention generally relate to telecommunications and more specifically techniques for auto-assigning IP telephony extension numbers based on ports.

Internet Protocol (IP) telephony has become very popular as many entities switch to voice over IP (VOIP) telephony systems. IP telephony may provide more features than traditional public switch telephone network (PSTN) systems and may be more cost efficient.

Two options for assigning IP telephony device handset extension numbers may be used. The first option assigns extension numbers based on an IP telephony device's media access control (MAC) address. Each IP telephony device has a unique MAC address. Thus, each IP telephony device can be assigned a specific extension number based on the MAC address. Accordingly, no matter where the IP telephony device is connected, the IP telephony device will get the same extension number assigned. For example, an IP telephony device with a certain MAC address will be assigned extension 101 if it is plugged into a port #3 or port #23 of a switch.

The second option assigns extension numbers based on the order the IP telephony devices are plugged into the system. For example, the first phone plugged in to a port of the system will always receive extension 101. This will be assigned regardless of which port the IP telephony device is plugged into. Therefore, the IP telephony device can be plugged in to port #3, port #23, or any other port, and will still receive extension 101 if it is the first IP telephony device to be plugged into the system.

The above options have many disadvantages. For example, the assignment of extension numbers may be confusing for an administrator that is trying to match a building layout, restrict phone usage in particular physical areas, and/or migrate from an analog phone system that uses punch-down blocks that physically map to a phone port at a specific location and remain constant. Further, if an IP telephony device is removed from a port and plugged into another port, it may be assigned a different extension if the extensions are assigned based on plug-in order. This may be confusing to people trying to contact a user that has been assigned a different extension.

DETAILED DESCRIPTION OF EMBODIMENTS OF THE INVENTION

In one embodiment, techniques are provided for assigning extension numbers to Internet Protocol (IP) telephony devices. The techniques include receiving a message from the IP telephony device requesting that an extension be assigned. A port identifier of a port in which the IP telephony device is coupled is determined. Extension numbers are fixed for specific ports. Thus, an extension number for the port identifier of the port is determined. The extension number is then assigned to the IP telephony device. For example, a MAC address for the IP phone is assigned to the extension number.

Figure 1:
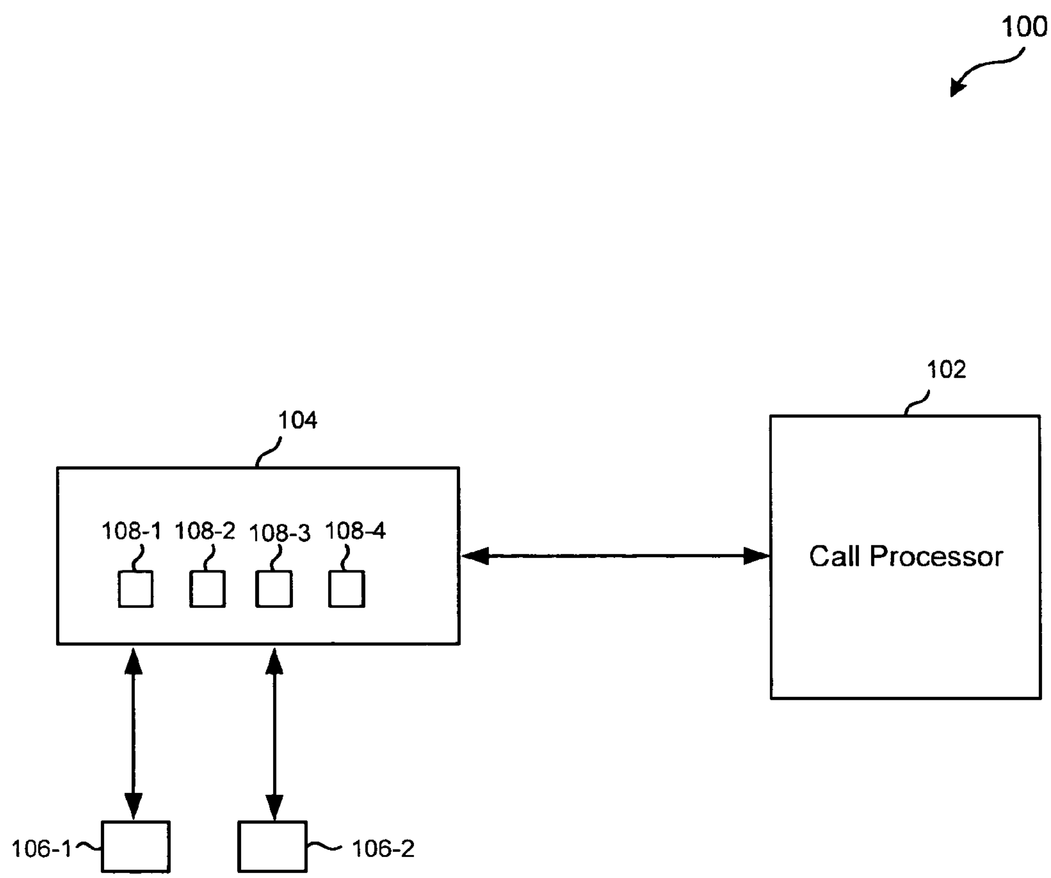
FIG. 1 depicts a system for auto-assigning extensions to IP telephony devices according to one embodiment of the present invention.

FIG. 1 depicts a system 100 for auto-assigning extensions to IP telephony devices 106 according to one embodiment of the present invention. As shown, a call processor 102, a switch 104, and an IP telephony device 106 are provided. It will be understood that any number of call processors 102, switches 104, and IP telephony devices 106 may be provided in system 100.

IP telephony device 106 may be any IP device that is voice-enabled. For example, IP telephony device 106 may be an IP phone or handset, soft phone, instant messaging client, personal digital assistant, etc.

IP telephony device 106 is configured to be plugged into or coupled to a port 108 of switch 104. Switch 104 includes a set of ports 108. Ports may be physical or logical. A physical port may be a specific place that allows a physical connection to IP telephony device 106. For example, a port may be a jack, outlet, plug, etc. A logical port is a virtual port. Ports 108 may be assigned identifiers, such as port numbers.

Call processor 102 may be included in a telephone system. For example, call processor 102 may be part of a private branch exchange (PBX) system, part of a server, part of switch 104, or may be located in any part of a telephony network.

Call processor 102 is configured to assign an extension to IP telephony device 106. The extension is assigned based on a port 108 that IP telephony device 106 has been plugged into. Each extension is fixed to a specific port. For example, port 108-1 may be assigned the extension 101, port 108-2 may be assigned the extension 102, port 108-3 may be assigned the extension 103, etc. In one embodiment, no matter which IP telephony device 106 is plugged into port 108, the same extension number is assigned. For example, if IP telephony device 106-1 is plugged into port 108-1, it is assigned extension 101. If IP telephony device 106-2 is then plugged into port 108-1, telephony device 106-2 is also assigned extension 101.

An extension may be any number that uniquely identifies the extension. For example, an extension number may be a directory number or any other phone number. Although extension numbers are described, it will be understood that any characters, symbols, etc., may be assigned as an extension number.

Figure 2:
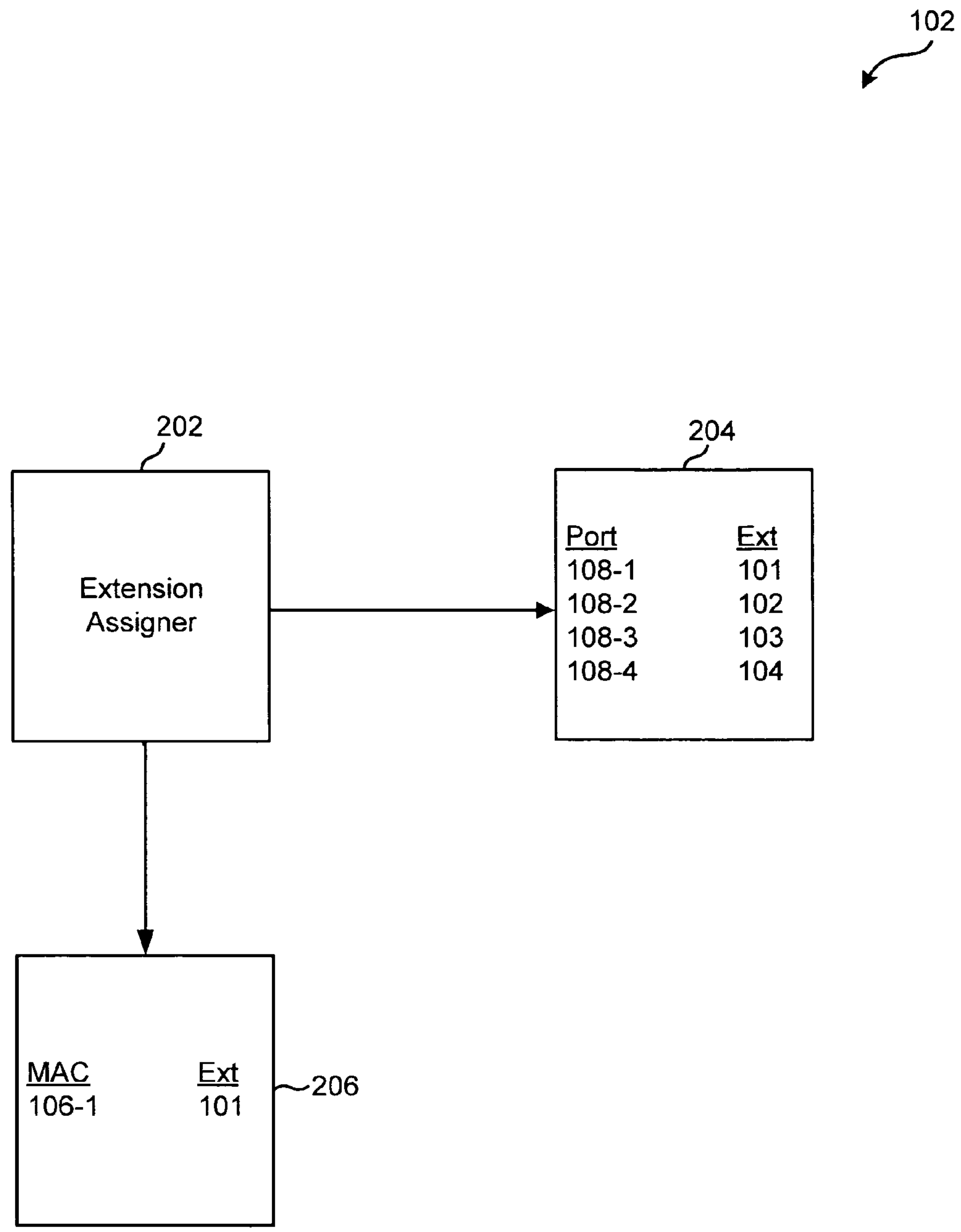
FIG. 2 depicts a more detailed embodiment of a call processor according to embodiments of the present invention.

FIG. 2 depicts a more detailed embodiment of call processor 102 according to embodiments of the present invention. As shown, call processor 102 includes an extension assigner 202, a port/extension list 204, and an extension assignment list 206.

Extension assigner 202 receives a port identifier from switch 104. The port identifier identifies a port 108 in which telephony device 106 has been plugged into and may be any information that uniquely identifies the port. Extension assigner 202 determines the port identifier based on a message received from switch 104. Switch 104 may insert the port identifier using various methods, some of which are described in more detail below.

Extension assigner 202 accesses port/extension list 204 to determine an extension to assign to telephony device 106. For example, if the port identifier is for port 108-1, then it is determined that extension 101 is associated with the port identifier. Although list 204 is described, it will be recognized that any methods may be used to determine which extension to assign to which port identifier as long as the same extension is assigned to the same port identifier.

Once the extension is determined, that extension is assigned to telephony device 106. In one embodiment, extension assigner 202 receives a MAC address for telephony device 106. Extension assigner 202 assigns the MAC address to the extension determined. This assignment may be stored in extension assignment list 206. The assignment may be used to allow telephony device 106 to make or receive calls using the extension.

Figure 3:
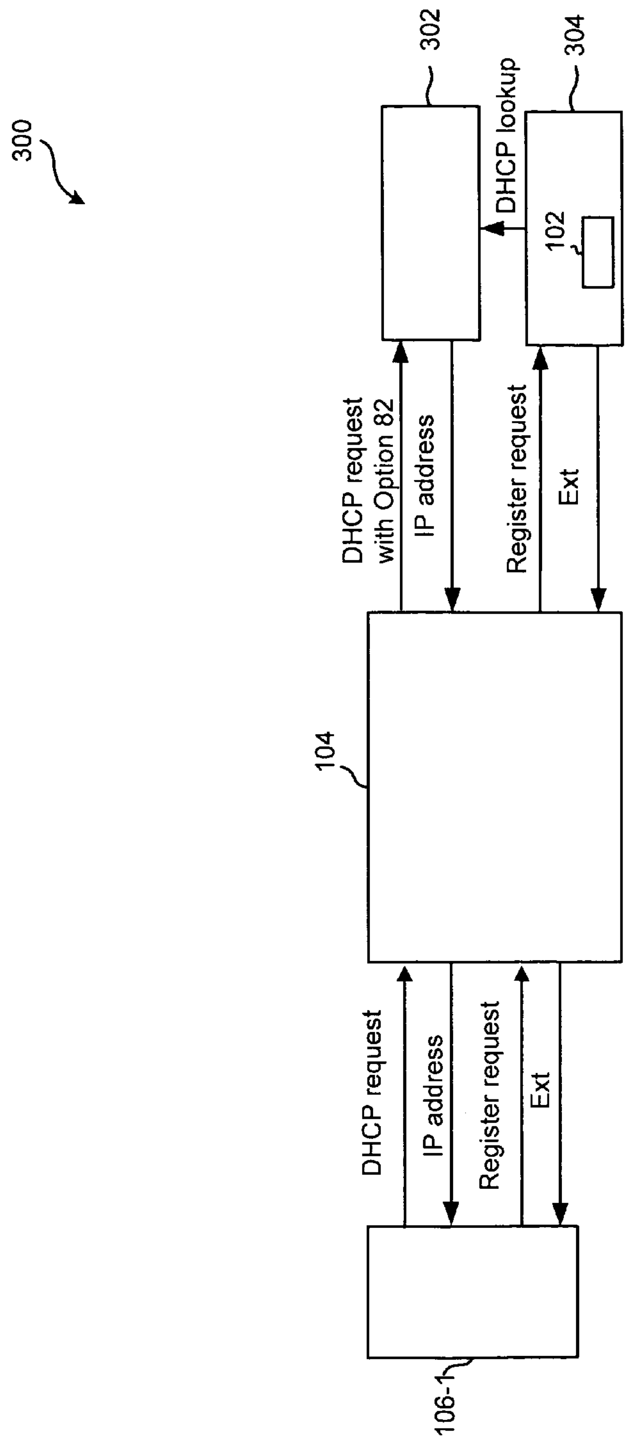
FIG. 3 depicts a system for auto-assigning IP extensions according to one embodiment of the present invention.

FIG. 3 depicts a system 300 for auto-assigning IP extensions according to one embodiment of the present invention. In one embodiment, switch 104 snoops a dynamic host configuration protocol (DHCP) request from IP telephony device 106 and provides a port identifier in the request to call processor 102.

In one embodiment, IP telephony device 106 sends a DHCP request when it is initialized and plugged into port 108. Switch 104 snoops the request. In snooping the request, the request may be intercepted for further processing. Switch 104 then inserts the port identifier into the request. For example, switch 104 may implement Option 82, which is a DHCP option that inserts port information into a DHCP request from telephony device 106. The request is then sent to a DHCP server 302. DHCP server 302 may save a MAC address for telephony device 106 with the Option 82 data. Also, DHCP server 302 is configured to send an IP address to a telephony device 106.

IP telephony device 106 then registers with call processor 102, which may be part of an IP PBX/KTS (Private Branch Exchange/Key Telephone System) 304. Although IP PBX/KTS 304 is shown as being separate from DHCP server 302, it will be understood that DHCP server 302 may or may not be part of IP PBX/KTS 304. Call processor 102 is configured to do a DHCP look-up to determine the associated port identifier. For example, a registration request includes the MAC address of telephony device 106 and call processor 102 looks up the Option 82 data that was previously stored with the MAC address.

Call processor 102 is configured to determine which port 108 in switch 104 IP telephony device 106 is attached to based on the port information found in the Option 82 data. The extension for port 108 is then determined and assigned to IP telephony device 106.

Figure 4:
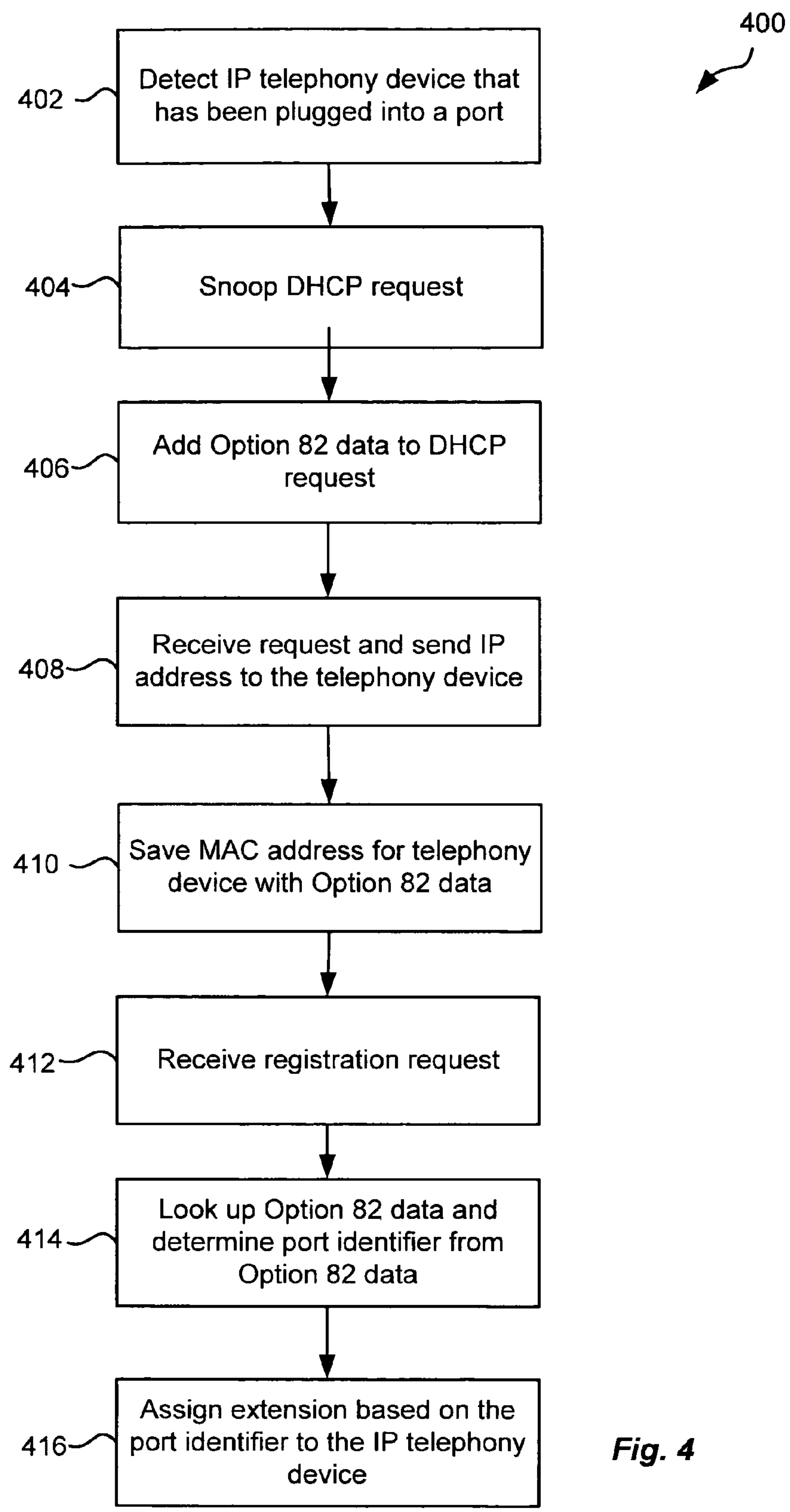
FIG. 4 depicts a simplified flow chart for a method for inserting port information into a DHCP request according to one embodiment of the present invention.

FIG. 4 depicts a simplified flow chart 400 for a method for inserting port information into a DHCP request according to one embodiment of the present invention. Step 402 detects an IP telephony device 106 that has been plugged into port 108.

Step 404 snoops a DHCP request from IP telephony device 106. Step 406 adds Option 82 data to the DHCP request. For example, a port identifier may be inserted into the DHCP request.

In step 408, DHCP server 302 receives the DHCP request and sends an IP address to IP telephony device 106. Step 410 then saves a MAC address for IP telephony device 102 with the Option 82 data.

In step 412, call processor 102 receives a registration request from IP telephony device 106. Step 414 looks up the Option 82 data that was stored and determines a port identifier from the Option 82 data. The port identifier is for a port 108 which IP telephony device 106 is plugged into.

Step 416 assigns an extension based on the port identifier to IP telephony device 106. The MAC address for IP telephony device 106 may also be saved with the extension.

Figure 5:
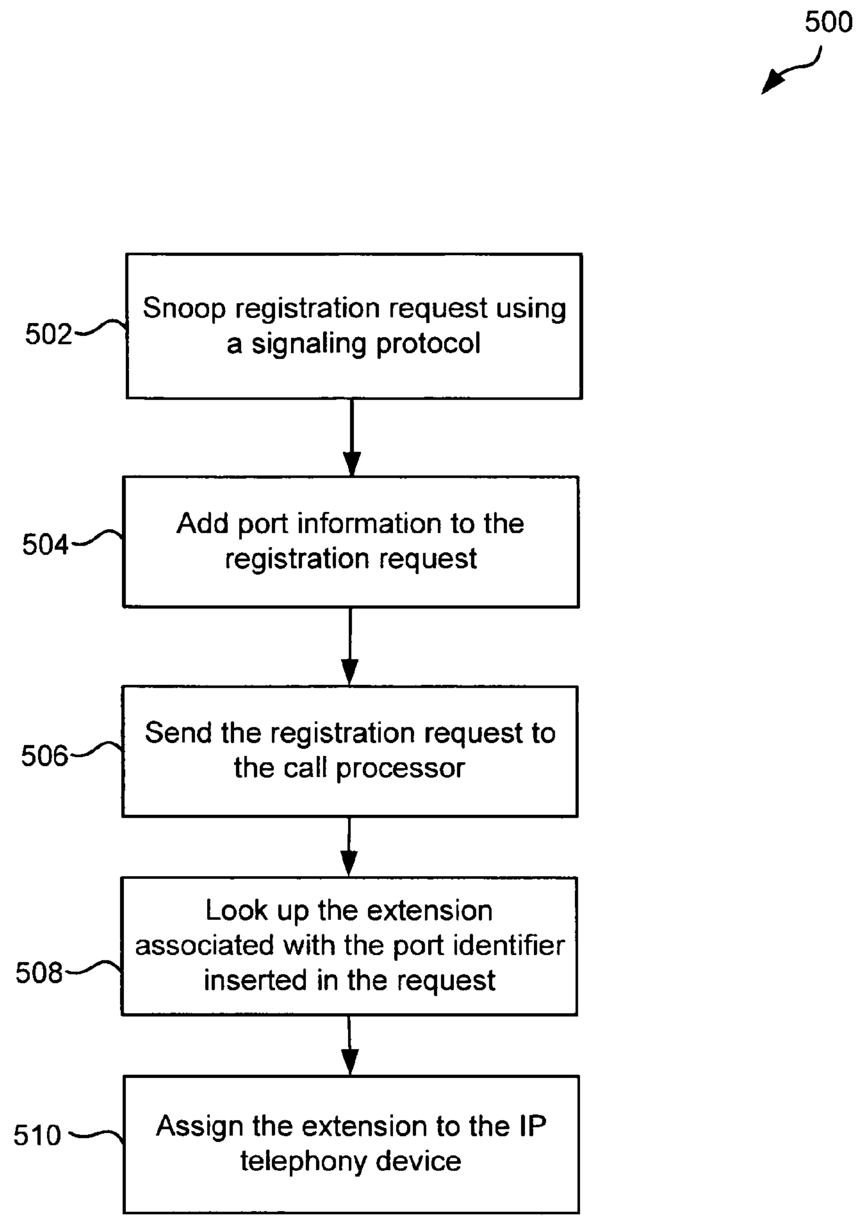
FIG. 5 depicts a simplified flow chart of another embodiment of a method for auto-assigning IP extensions according to embodiments of the present invention.

FIG. 5 depicts a simplified flow chart 500 of another embodiment of a method for auto-assigning IP extensions according to embodiments of the present invention. Step 502 snoops a registration request using a signaling protocol. For example, a skinny client control protocol (SCCP) may be used to send a registration request.

Step 504 adds the port information to the registration request. In one embodiment, the SCCP protocol may be extended such that switch 104 can snoop the registration request and insert the port information in the request. For example, a port identifier may be inserted into the request.

Step 506 sends the registration request to call processor 102.

In step 508, call processor 102 looks up an extension associated with the port identifier that is inserted in the registration request. Step 510 then assigns the extension for the port identifier to IP telephony device 106.

In this embodiment, certain fields in the registration request may be configured to include the port identifier. For example, if SCCP is used, SCCP-registered fields may be enhanced to include the port identifier.

Figure 6:
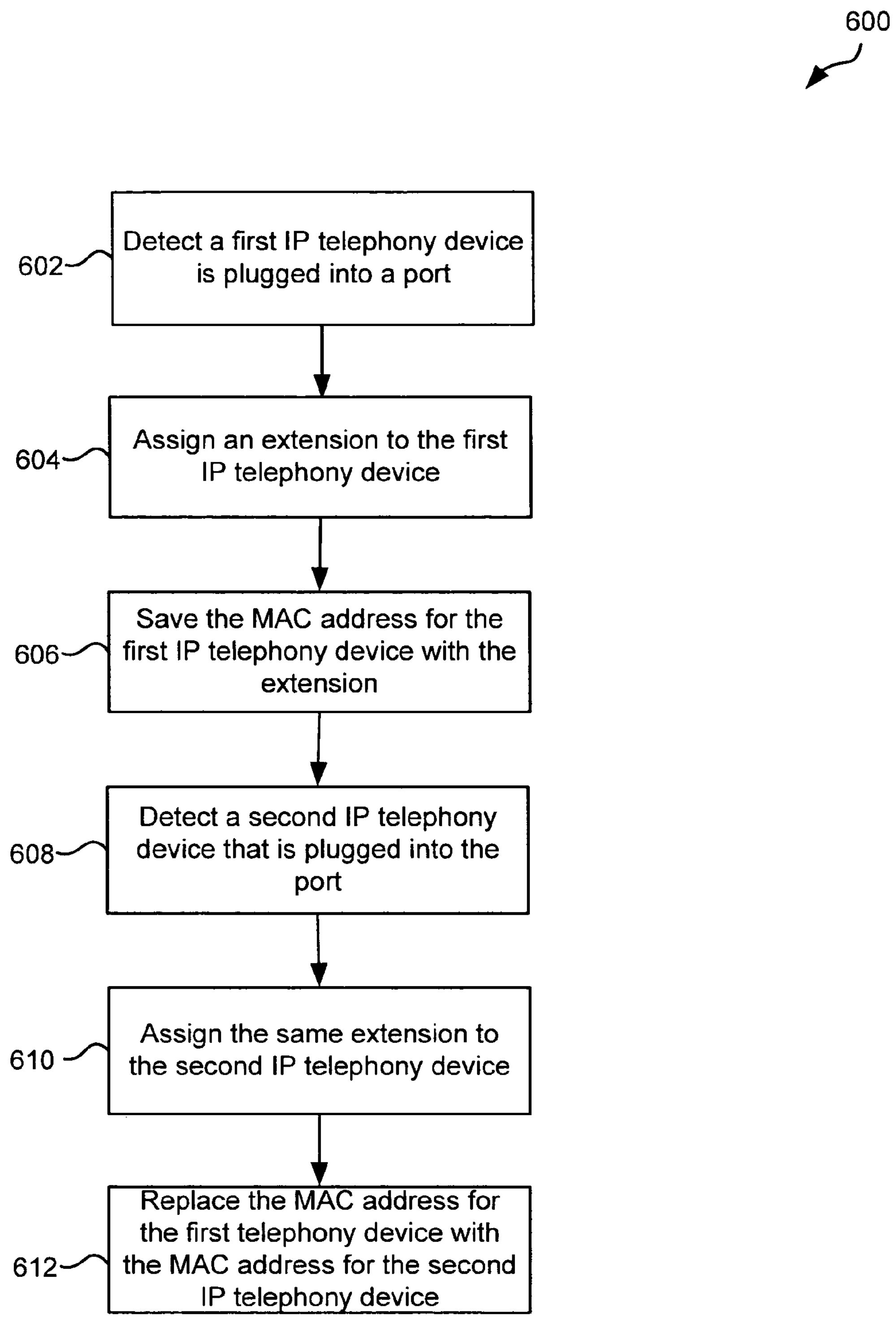
FIG. 6 depicts a simplified flow chart of a method for assigning extensions to multiple phones using the same port according to one embodiment of the present invention.

FIG. 6 depicts a simplified flow chart 600 of a method for assigning extensions to multiple phones using the same port 108 according to one embodiment of the present invention. Step 602 detects that IP telephony device 106-1 is plugged into port 108-1. Step 604 assigns an extension, such as extension 101, to IP telephony device 106-1. Step 606 saves the MAC address for IP telephony device 106-1 with extension 101 in extension assignment list 206.

Step 608 detects that IP telephony device 108-2 is plugged in to port 106-1. Thus IP telephony device 106-1 has been removed from port 108-1. Thus, a new IP telephony device 106 with a new MAC address is plugged into the same port 108.

Step 610 assigns extension 101 to IP telephony device 106-2 based on it being plugged into port 108-1. This is the same extension that was assigned to telephony device 106-1. Step 612 then replaces the MAC address for IP telephony device 106-1 with the MAC address for IP telephony device 106-2 in extension assignment list 206 for extension 101.

Accordingly, as multiple IP telephony devices 106 are plugged into the same port 108 and are assigned the same extension.

Embodiments of the present invention provide many advantages. For example, a one-to-one port-extension mapping is provided. Thus, one knows that any IP telephony device 106 plugged into a port will have the same extension number. This overcomes problems where extensions should not be changed when IP telephony devices 106 are plugged into the same port. For example, in a lobby of a company, it should not matter which IP telephony device 106 is plugged into port 108 in the lobby. The port should always have the same extension. For example, a company does not want to have different extensions for a lobby phone.

Also, different locations may have different permissions. For example, a lobby phone may have permissions to make long distance calls, internal calls to offices, etc. These permissions should stay the same no matter which IP telephony device 106 is plugged into port 108. Thus, the same extension and permissions should be assigned to IP telephony devices 106 plugged into the same port 108.

Although the invention has been described with respect to specific embodiments thereof, these embodiments are merely illustrative, and not restrictive of the invention.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. An apparatus configured to assign an extension number to an Internet protocol (IP) telephony device in a network, the apparatus comprising:

means for detecting, using a switch in the network, a first IP telephony device being coupled to a first port on the switch;

a processor; and a plurality of instructions encoded in a non-transitory machine-readable medium for execution by the processor and when executed cause the processor to perform operations including:

determining, at the switch, a port identifier of the first port via a dynamic host configuration protocol (DHCP) lookup, wherein the port identifier is saved during a DHCP request using an Option 82 request that inserts the port identifier into the DHCP request;

receiving, at the switch, a first message from the first IP telephony device, wherein the first message includes a request for an IP address for the first IP telephony device;

modifying, at the switch, the first message by including in the first message the port identifier of the first port;

sending, from the switch, the modified first message to a call processor in order for the call processor to assign the extension number to the first IP telephony device, wherein the extension number is fixed for each physical port in the network, the extension number obtained by searching a list at the call processor that associates the determined port identifier with an assigned extension number for the port identifier, the port identifier identifying a physical port the first IP telephony device is plugged into; and receiving the assigned extension number at the switch, the assigned extension number associated with the physical port the first IP telephony device is plugged into.

2. A method for assigning extension numbers to Internet protocol (IP) telephony devices in a network, the method comprising:

determining, at a switch, a port identifier of a first port on the switch coupled a first IP telephony device via a dynamic host configuration protocol (DHCP) lookup, wherein the port identifier is saved during a DHCP request using an Option 82 request that inserts the port identifier into the DHCP request;

receiving, at the switch, a first message from the first IP telephony device, wherein the first message includes a request for an IP address for the first IP telephony device;

modifying, at the switch, the first message by including in the first message the port identifier of the first port;

sending, from the switch, the modified first message to a call processor in order for the call processor to assign the extension number to the first IP telephony device, wherein the extension number is fixed for each physical port in the network, the extension number obtained by searching a list at the call processor that associates the determined port identifier with an assigned extension number for the port identifier, the port identifier identifying a physical port the first IP telephony device is plugged into; and receiving the assigned extension number at the switch, the assigned extension number associated with the physical port the first IP telephony device is plugged into.

3. The method of claim 2, further comprising:

detecting, by the switch, the first IP telephony device being coupled to the first port on the switch.

4. The method of claim 2, wherein assigning the extension number using the call processor comprises:

receiving a device identifier associated with the IP telephony device in the modified first message; and assigning the device identifier to the assigned extension number.

5. The method of claim 4, wherein the device identifier comprises a media access control (MAC) address.

6. The method of claim 2, further comprising:

receiving, using the call processor, a second message that is originated from a second IP telephony device, wherein the second message includes a port identifier of a second port to which the second IP telephony device is coupled;

determining, using the call processor and based on the port identifier of the second port, an extension number associated with the second port, wherein the second port is same as the first port to which the first IP telephony device was previously coupled, wherein the extension number associated with the second port is same as the extension number associated with the first port; and assigning the extension number previously assigned to the first IP telephony device to the second IP telephony device.

7. The method of claim 2, wherein determining the port identifier of the first port comprises determining the port identifier from the first message, wherein the port identifier is added to the first message by the switch.

8. The method of claim 7, wherein the port identifier of the first port is inserted into the first message using a signaling protocol.

9. The method of claim 2, wherein the list includes information for a fixed mapping between each port and the associated extension number such that any IP telephony devices requesting extension numbers when coupled to the first port are assigned an identical extension number.

10. An apparatus configured to assign extension numbers to Internet protocol (IP) telephony devices in a network, the apparatus comprising:

a processor; and a non-transitory machine-readable storage medium including a plurality of instructions for execution by the processor and when executed cause the one or more processor to perform operations including:

determining, at a switch, a port identifier of a first port on the switch coupled a first IP telephony device via a dynamic host configuration protocol (DHCP) lookup, wherein the port identifier is saved during a DHCP request using an Option 82 request that inserts the port identifier into the DHCP request;

receiving, at the switch, a first message from the first IP telephony device, wherein the first message includes a request for an IP address for the first IP telephony device;

modifying, at the switch, the first message by including in the first message the port identifier of the first port;

sending, from the switch, the modified first message to a call processor in order for the call processor to assign the extension number to the first IP telephony device, wherein the extension number is fixed for each physical port in the network, the extension number obtained by searching a list at the call processor that associates the determined port identifier with an assigned extension number for the port identifier, the port identifier identifying a physical port the first IP telephony device is plugged into; and receiving the assigned extension number at the switch, the assigned extension number associated with the physical port the first IP telephony device is plugged into.

11. The apparatus of claim 10, wherein the plurality of instructions are further cause the processor to perform operations including:

receiving a device identifier associated with the IP telephony device in the modified first message; and assigning the device identifier to the extension number.

12. The apparatus of claim 11, wherein the device identifier comprises a media access control (MAC) address.

13. The apparatus of claim 10, wherein the plurality of instructions further cause the processor to perform operations including:

receiving, using the call processor, a second message that is originated from a second IP telephony device, wherein the second message includes a port identifier of a second port to which the second IP telephony device is coupled;

determining, using the call processor and based on the port identifier of the second port, an extension number associated with the second port, wherein the second port is same as the first port to which the first IP telephony device was previously coupled, wherein the extension number associated with the second port is same as the extension number associated with the first port; and assigning the extension number previously assigned to the first IP telephony device to the second IP telephony device.

14. The apparatus of claim 10, wherein the plurality of instructions cause the processor to determine the port identifier from the first message, wherein the port identifier is added to the first message by the switch.

15. The apparatus of claim 14, wherein a signaling protocol inserts the port identifier into the first message.

16. The apparatus of claim 10, wherein plurality of instructions cause the processor to assign an identical extension number to any IP telephony devices requesting extension numbers when coupled to the first port, wherein the list includes information for a fixed mapping between each port and each extension number.

17. The apparatus of claim 1, wherein the first IP telephony device is running a skinny client control protocol and the port identifier is included in a skinny client control protocol registered field.

* * * * *